(No Model.)
A. DALKE & G. WIENS.
WHEEL PLOW.
No. 495,312. Patented Apr. 11, 1893.
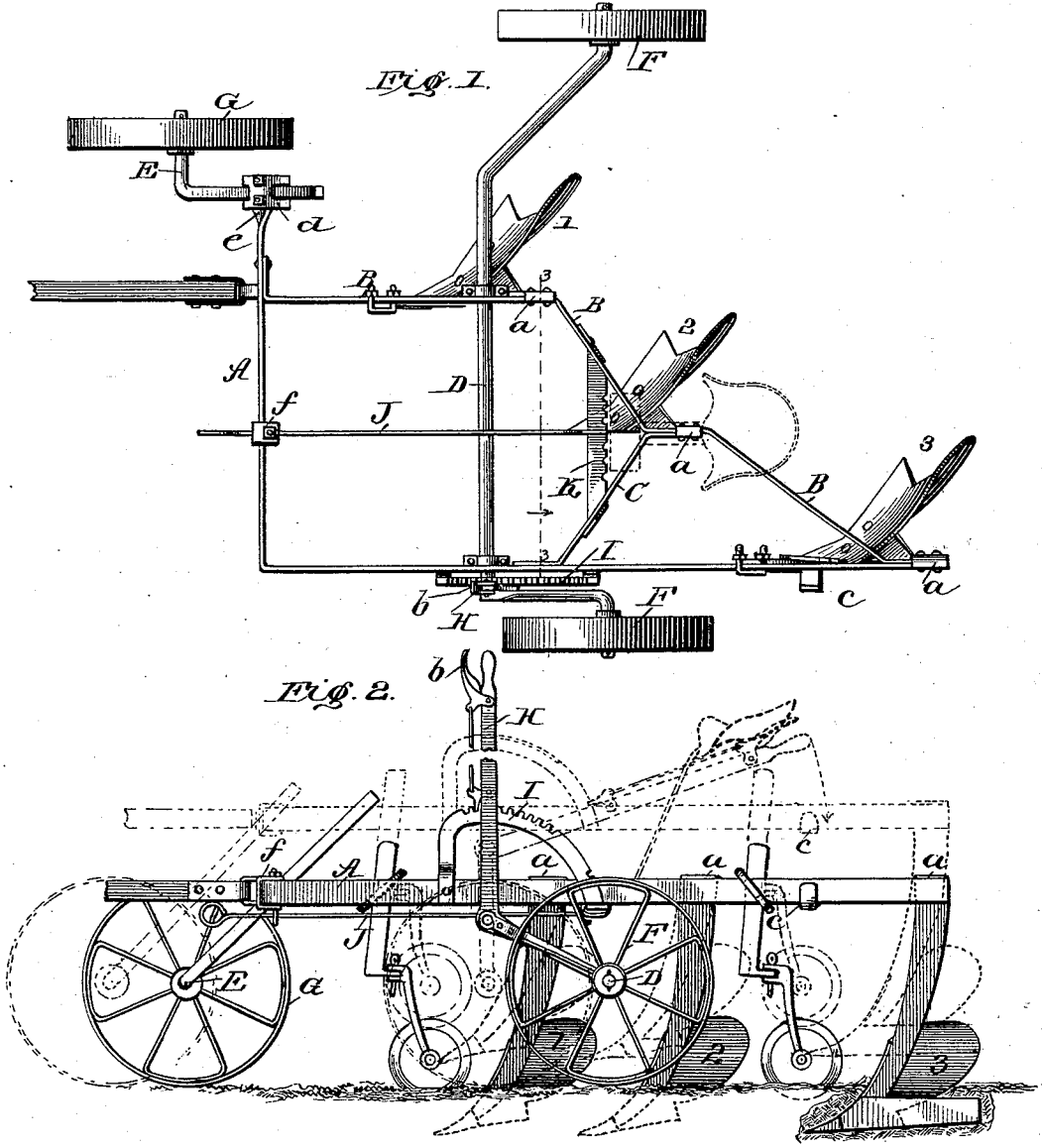
WITNESSES:
Fred G. Dieterich
Amos W. Hart
INVENTORS:
Abraham Dalke
Gustav Wiens
BY
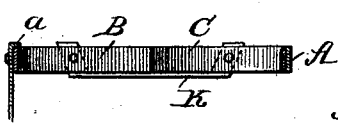
ATTORNEYS.

UNITED STATES PATENT OFFICE.

ABRAHAM DALKE AND GUSTAV WIENS, OF HENDERSON, NEBRASKA.

WHEEL-PLOW.

SPECIFICATION forming part of Letters Patent No. 495,312, dated April 11, 1893.

Application filed December 7, 1892. Serial No. 454,407. (No model.)

*To all whom it may concern:*

Be it known that we, ABRAHAM DALKE and GUSTAV WIENS, of Henderson, in the county of York and State of Nebraska, have invented a new and useful Improvement in Wheel-Plows, of which the following is a specification.

My invention belongs to that class of wheel gang plows whose frames are adjustable vertically by means of cranked axles.

The improvement is embodied in certain features of construction, arrangement, and combination of parts as hereinafter specifically indicated.

In the accompanying drawings—Figure 1 is a plan view of my plow. Fig. 2 is a side view of the same, and Fig. 3 is a transverse section on line 3—3 of Fig. 1.

The frame proper of the gang plow is composed mainly of the right-angular bar A, and the bar B, which has two bends or obtuse angles. The said bars are bolted together at the ends and braced by a third bar C, which is arranged at an angle of forty-five degrees to the longer side of the bar A, and forms a right angle with one of the obtuse angles of bar B. There are three plows proper 1—2—3, one being attached to the rear end of the frame A and the other two to the bar B, contiguous to its angular portions. Each plow standard is rigidly secured to the frame by means of two bolts, as shown best in Fig. 1, and its upper end is provided with horizontal lateral flanges a, which bear on the upper and under edges of the bar B, and thus contribute materially to the rigidity and security of the attachment. It will be noted (Fig. 2) that the rear plow 3 is alone provided with a landside—for a purpose hereinafter stated.

The means for supporting the frame A B and its attached plows when traveling on the roadway or across a field, and also for adjusting the said frame higher or lower in order to cause the plows to run at different depths, are the bent axles D and E, and wheels F F and G applied to them as shown. The longer and main axle D, is arranged transversely, about the middle of the frame A, and underneath the same, and is held in journal-boxes bolted to the bars A, B, as shown. The wheels F, F, are mounted on its ends. The means for adjusting, *i. e.* rocking this axle D, to raise or lower the frame, as indicated by dotted lines Fig. 2, is the hand lever H, which is rigidly attached to said axle at a point adjacent to the bar A, and provided with a pivoted spring-pressed dog $b$, for locking it to a notched fixed segment I, in a well known manner. When the lever H is vertical, as shown by full lines in Fig. 2, the plows run at the greatest depth, and at the least depth when inclined rearward as shown by dotted lines in same figure. A keeper $c$ is attached to rear end of the frame bar A, to support the lever H, when required. The front axle E, is a right-angular bar arranged at the right-hand corner of the frames A, B, and held inclined forward, at an angle of about forty-five degrees, by means of a keeper $d$, attached to a lateral extension $e$, of the frame bar A. The said extension is turned, or twisted, to bring it into parallelism to the required plane of the axle E. The wheel G, is applied to the laterally bent portion of this axle E, as shown. The axle may be adjusted higher or lower in the keeper $d$, and clamped in any adjustment by any suitable means, such as a clamp-screw. The plows 1, 2, 3, are arranged in gangs, or on a line diagonal to the line of draft, in the usual way, and the front wheel, if it were used. The wheel runs in the last furrow made by the plow, and serves to guide the front portion of the latter in the true or required direction, *i. e.* parallel to the said furrow. The wheel thus performs a function which renders it unnecessary to provide the two front plows 1 and 2, with landsides. In other words, the wheel G, and rear landside plow 3, serve as guides which aid in keeping the gang plow as a whole, in the required line. The draft tension is of course a factor in this matter, and it is applied to a rod J, which is held by a keeper $f$, and provided at its rear end with a loop that embraces the transverse draft bar K. The rear edge of the latter is provided with notches to enable the draft-rod to be adjusted laterally as required. The ends of the draft bar K are bent upward and bolted upon the rear sides of the brace bar C, and an angle of the frame bar B, as shown best in Fig. 1. The draft-bar thus strengthens the plow frame, and enables it to resist the heavy draft strain. The frame bars A, B, C, are preferably constructed of steel, for sake of lightness and strength. The wheels have a cast-iron hub and flat and curved steel spokes which are connected with the hubs in the process of casting. The plow tongue, (not shown) is attached to the frame by a loose joint. A rolling, or wheel, colter is arranged in front of each plow proper, and its standard is as shown jointed to allow the latter to swing laterally and thus "track" in the desired manner.

What we claim is—

In a gang-plow, the combination, with the angular frame, and the furrow-wheel, G, attached at one corner and adapted for vertical adjustment, of the axle, D, extending across the middle portion of said frame and having two opposite cranked, or bent, journal arms, the wheels F, mounted thereon, and means for rocking and locking the axle in any adjustment, as shown and described.

ABRAHAM DALKE.
GUSTAV WIENS.

Witnesses:
A. C. NEUFELD,
M. HIEBERT.